(12) United States Patent
Wang et al.

(10) Patent No.: US 10,425,427 B2
(45) Date of Patent: *Sep. 24, 2019

(54) TEMPLATE UNIFORM RESOURCE LOCATOR SIGNING

(71) Applicant: Futurewei Technologies, Inc., Plano, TX (US)

(72) Inventors: Xin Wang, Rancho Palos Verdes, CA (US); Shaobo Zhang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 213 days.

This patent is subject to a terminal disclaimer.

(21) Appl. No.: 15/186,220

(22) Filed: Jun. 17, 2016

(65) Prior Publication Data
US 2016/0373462 A1  Dec. 22, 2016

Related U.S. Application Data

(60) Provisional application No. 62/182,043, filed on Jun. 19, 2015.

(51) Int. Cl.
*H04L 29/00* (2006.01)
*H04L 29/06* (2006.01)
(Continued)

(52) U.S. Cl.
CPC ............ *H04L 63/108* (2013.01); *G06F 21/10* (2013.01); *G06F 21/64* (2013.01);
(Continued)

(58) Field of Classification Search
CPC ..... H04L 63/108; H04L 67/146; H04L 67/02; H04L 65/4069; H04L 63/0823; H04L 63/10; H04L 63/168; H04L 63/083; H04L 63/1491; G06F 21/10; G06F 21/64; G06F 2221/2111

See application file for complete search history.

(56) References Cited

U.S. PATENT DOCUMENTS 7,089,585 B1 * 8/2006 Dharmarajan ...... H04L 63/0815
                                                                370/312
7,213,249 B2   5/2007 Tung Loo et al.
(Continued)

FOREIGN PATENT DOCUMENTS

CN      101351784 A    1/2009
CN      103297435 A    9/2013
(Continued)

OTHER PUBLICATIONS

Vercher, Brady. "Protect Your Products and Improve Your Systems with Signed URLs." Internet publication May 16, 2013. (Year: 2013).*

(Continued)

*Primary Examiner* — Don G Zhao
(74) *Attorney, Agent, or Firm* — Conley Rose, P.C.

(57) ABSTRACT

An apparatus including a memory configured to store content items, and a processor operably coupled to the memory and configured to generate Uniform Resource Locator (URL) signing information based on a segment URL scope descriptor. The segment URL scope descriptor authorizes a client to access a set of the content items.

11 Claims, 7 Drawing Sheets

(51) Int. Cl.
  *G06F 21/64* (2013.01)
  *G06F 21/10* (2013.01)
  *H04L 29/08* (2006.01)

(52) U.S. Cl.
  CPC .......... *H04L 63/0823* (2013.01); *H04L 63/10* (2013.01); *H04L 65/4069* (2013.01); *H04L 67/02* (2013.01); *H04L 67/146* (2013.01); *H04L 63/168* (2013.01)

(56) References Cited

U.S. PATENT DOCUMENTS

| | | | |
|---|---|---|---|
| 7,228,437 B2 | 6/2007 | Spagna et al. | |
| 8,924,582 B2* | 12/2014 | Giladi | H04L 67/108 709/231 |
| 9,628,487 B2 | 4/2017 | Wang et al. | |
| 10,057,277 B2 | 8/2018 | Wang et al. | |
| 2004/0153648 A1 | 8/2004 | Rotholtz et al. | |
| 2007/0044157 A1* | 2/2007 | Taguchi | G06F 21/10 726/27 |
| 2010/0146287 A1 | 6/2010 | Kreiner et al. | |
| 2010/0174770 A1 | 7/2010 | Pandya | |
| 2011/0082940 A1 | 4/2011 | Montemurro et al. | |
| 2011/0119394 A1 | 5/2011 | Wang et al. | |
| 2011/0228775 A1 | 9/2011 | Lee et al. | |
| 2011/0246762 A1 | 10/2011 | Adams et al. | |
| 2012/0072731 A1 | 3/2012 | Winograd et al. | |
| 2012/0090036 A1 | 4/2012 | Kang et al. | |
| 2012/0239598 A1 | 9/2012 | Cascaval et al. | |
| 2012/0278467 A1 | 11/2012 | Schneider | |
| 2013/0042100 A1* | 2/2013 | Bouazizi | H04N 21/254 713/151 |
| 2013/0144714 A1 | 6/2013 | Yuan et al. | |
| 2013/0182643 A1* | 7/2013 | Pazos | H04L 65/4076 370/328 |
| 2013/0185398 A1* | 7/2013 | Thang | H04N 21/6125 709/219 |
| 2013/0185756 A1* | 7/2013 | Frojdh | H04N 21/23439 725/88 |
| 2013/0246278 A1 | 9/2013 | Purdy, Sr. et al. | |
| 2013/0268577 A1* | 10/2013 | Oyman | H04W 76/16 709/203 |
| 2013/0275557 A1* | 10/2013 | Myers | H04N 21/2221 709/219 |
| 2013/0286879 A1* | 10/2013 | ElArabawy | H04N 21/26208 370/252 |
| 2013/0290492 A1* | 10/2013 | ElArabawy | H04L 65/80 709/219 |
| 2013/0290555 A1* | 10/2013 | Einarsson | H04N 21/6125 709/231 |
| 2013/0298170 A1* | 11/2013 | ElArabawy | H04W 28/0231 725/62 |
| 2013/0347123 A1 | 12/2013 | Zhang et al. | |
| 2014/0013375 A1* | 1/2014 | Giladi | H04L 67/108 725/112 |
| 2014/0019635 A1* | 1/2014 | Reznik | H04L 65/607 709/231 |
| 2014/0041010 A1 | 2/2014 | Udupa et al. | |
| 2014/0096271 A1* | 4/2014 | Wang | G06F 21/10 726/30 |
| 2014/0156865 A1* | 6/2014 | Giladi | H04L 65/608 709/231 |
| 2014/0281556 A1* | 9/2014 | Mao | H04L 63/126 713/176 |
| 2014/0310819 A1* | 10/2014 | Cakarel | H04N 21/2225 726/26 |
| 2015/0033023 A1 | 1/2015 | Xu et al. | |
| 2015/0089233 A1* | 3/2015 | Roth | H04L 9/3247 713/176 |
| 2015/0229471 A1* | 8/2015 | Nair | H04L 9/0822 713/171 |
| 2015/0271179 A1* | 9/2015 | Wang | H04L 63/10 726/30 |
| 2015/0326572 A1* | 11/2015 | Oyman | H04N 21/23439 726/4 |
| 2015/0350205 A1* | 12/2015 | Oyman | H04L 63/126 726/7 |
| 2016/0127330 A1* | 5/2016 | Roth | H04L 9/3247 713/168 |
| 2016/0173944 A1* | 6/2016 | Kilar | H04N 21/4516 725/12 |
| 2018/0027294 A1* | 1/2018 | Kwak | H04H 60/82 725/109 |

FOREIGN PATENT DOCUMENTS

| | | |
|---|---|---|
| CN | 103310141 A | 9/2013 |
| CN | 103310254 A | 9/2013 |
| CN | 103443786 A | 12/2013 |
| EP | 2469753 A2 | 6/2012 |
| WO | 2007103612 A2 | 9/2007 |
| WO | 2012126257 A1 | 9/2012 |
| WO | 2013152426 A1 | 10/2013 |
| WO | 2014012073 A1 | 1/2014 |
| WO | 2014113183 A1 | 7/2014 |

OTHER PUBLICATIONS

Brandenburg, R., "URI Signing for HTTP Adaptive Streaming (HAS)," draft-brandenburg-cdni-uri-signing-for-has-03, Jun. 6, 2016, 21 pages.
AWS "Amazon Simple Storage Service" API Reference API, Mar. 1, 2006, 414 pages.
Information Technology—Dynamic Adaptive Streaming over HTTP (DASH)—Part 1: media Presentation Description and Segment Formats / Amd 2: Spatial Relationship Description and Generalized URL Parameters, ISO/IEC 23009-1, Amendment 2, Draft, Jan. 30, 2014, 11 pages.
Leung, K., et al., "URI Signing for CDN Interconnection (CDNI)," draft-leung-cdni-uri-signing-05, Mar. 4, 2014, 35 pages.
"Information technology—Dynamic adaptive streaming over HTTP (DASH)—Part 1: Media presentation description and segment formats," ISO/IEC 23009-1:2012(E), First Edition, Apr. 1, 2012, 134 pages.
Foreign Communication From A Counterpart Application, PCT Application No. PCT/US2016/038216, International Search Report dated Sep. 28, 2016, 5 pages.
Foreign Communication From A Counterpart Application, PCT Application No. PCT/US2016/038216, Written Opinion dated Sep. 28, 2016, 6 pages.
Foreign Communication From A Counterpart Application, PCT Application No. PCT/US15/22317, International Search Report dated Jul. 1, 2015, 2 pages.
Foreign Communication From a Counterpart Application, PCT Application No. PCT/US15/22317, Written Opinion dated Jul. 1, 2015, 8 pages.
Foreign Communication From a Counterpart Application, European Application No. 15769034.8, Extended European Search Report dated Feb. 14, 2017, 9 pages.
Office Action dated May 5, 2016, 10 pages, U.S. Appl. No. 14/667,396, filed Mar. 24, 2015.
Notice of Allowance dated Sep. 15, 2016, 8 pages, U.S. Appl. No. 14/667,396, filed Mar. 24, 2015.
Notice of Allowance dated Dec. 5, 2016, 13 pages, U.S. Appl. No. 14/667,396, filed Mar. 24, 2015.
"DASH-IF Implementation Guidelines: Authentication and Authorization Information Signaling and Exchange Mechanisms (AAISEM)," Version 0.8, May 4, 2016, 24 pages.
Leung, K., et al., "URI Signing for CDN Interconnection (CDNI)," draft-ietf-cdni-uri-signing-04, Jun. 1, 2015, 55 pages.
Ni, W., et al., "Models for URL Signing and Validation in CDNI," draft-ni-cdni-url-signing-00.txt, Jul. 9, 2012, 10 pages.
"Extensible Markup Language (XML) 1.0 (Fifth Edition)," W3C Recommendation, Nov. 26, 2008, 37 pages.

(56) References Cited

OTHER PUBLICATIONS

"Information technology—Dynamic adaptive streaming over HTTP (DASH)—Part 1: Media presentation description and segment formats," International Standard, ISO/IEC 23009-1, Second Edition, May 15, 2014, 152 pages.
"Information technology—Dynamic adaptive streaming over HTTP (DASH)—Part 1: Media presentation description and segment formats," ISO/IEC JTC 1/SC 29, ISO/IEC 23009-1-1:2012(E), Jan. 5, 2012, 133 pages.
Wang, X., et al., "Adaptation of URL Signing in DASH: Partial URL Signing," ISO/IEC JTC1/SC29/WG11 M33271, Mar. 2014, 10 pages.
Law, W., et al., "Thoughts on URI Signing in MPEG DASH," ISO/IEC JTC1/SC29/WG11 m34320, Jul. 2014, 2 pages.
Gregorio, J., et al., "URI Template," RFC 6570, Mar. 2012, 34 pages.
Brandenburg, R., et al., "Models for HTTP-Adaptive-Streaming-Aware Content Distribution Network Interconnection (CDNI)," RFC 6983, Jul. 2013, 45 pages.
Leung, K., "CDNI—URL Signing for HAS Content," Cisco, 2012, 10 pages.
Giladi, A., et al., "Descriptions of Core Experiments on DASH Amendment," ISO/IEC JTC1/SC29/WG11 MPEG2015/N15215, Feb. 2015, 43 pages.
Machine Translation and Abstract of Chinese Publication No. CN101351784, Jan. 21, 2009, 84 pages.
Machine Translation and Abstract of Chinese Publication No. CN103310141, Sep. 18, 2013, 24 pages.
Machine Translation and Abstract of Chinese Publication No. CN103310254, Sep. 18, 2013, 16 pages.
Machine Translation and Abstract of Chinese Publication No. CN103443786, Dec. 11, 2013, 22 pages.
Foreign Communication From a Counterpart Application, Chinese Application No. 201580012067.X, Chinese Office Action dated Apr. 4, 2019, 3 pages.
Foreign Communication From a Counterpart Application, Chinese Application No. 201580012067.X, Chinese Search Report dated Mar. 26, 2019, 2 pages.
Sodagar, Iraj, "MPEG-DASH, ISO/IEC 23009-1, Dynamic Adaptive Streaming Over HTTP, A Short Tutorial," Sep. 21, 2011, 35 pages.
"Study of ISO/IEC DIS 23009-4 Segment Encryption and Authentication," ISO/IEC JTC1/SC29/WG11 MPEG2012/w 13088, International Organisation for Standardisation, Coding of Moving Pictures and Audio, Shanghai, China, Oct. 2012, 36 pages.
Liu, Yongliang, et al., "On Improving Segment Authentication for Dynamic Adaptive Streaming," ISO/IEC JTC1/SC29/WG11 MPEG2012/M26931, International Organisation for Standardisation, Coding of Moving Pictures and Audio, Shanghai, China, Oct. 2012, 3 pages.
"Information Technology—Dynamic Adaptive Streaming Over HTTP (DASH)—Part 1: Media Presentation Description and Segment Formats," ISO/IEC JTC 1/SC 29, ISO/IEC 23009-1: 2012(E), ISO/IEC JTC 1/SC 29/WG 11, Jan. 5, 2012, 133 pages.
Office Action dated Dec. 1, 2017, 13 pages, U.S. Appl. No. 15/462,627, filed Mar. 17, 2017.
Notice of Allowance dated Apr. 18, 2018, 8 pages, U.S. Appl. No. 15/462,627, filed Mar. 17, 2017.
Office Action dated Apr. 16, 2015, 3 pages, U.S. Appl. No. 13/731,864, filed Dec. 31, 2012.
Notice of Allowance dated Feb. 22, 2016, 5 pages, U.S. Appl. No. 13/731,864, filed Dec. 31, 2012.
Office Action dated Aug. 28, 2014, 11 pages, U.S. Appl. No. 13/731,864, filed Dec. 31, 2012.
Office Action dated Feb. 2, 2015, 11 pages, U.S. Appl. No. 13/731,864, filed Dec. 31, 2012.
Office Action dated Jun. 11, 2015, 14 pages, U.S. Appl. No. 13/731,864, filed Dec. 31, 2012.
Office Action dated Dec. 3, 2015, 9 pages, U.S. Appl. No. 13/731,864, filed Dec. 31, 2012.
Foreign Communication From a Counterpart Application, European Application No. 14857820.6, Extended European Search Report dated Jul. 28, 2016, 8 pages.
Foreign Communication From a Counterpart Application, PCT Application No. PCT/US2014/062710, International Search Report dated Feb. 18, 2015, 1 page.
Office Action dated Oct. 7, 2016, 22 pages, U.S. Appl. No. 14/526,264, filed Oct. 28, 2014.

* cited by examiner

Complete URL

*Fig. 5*

Signed URL http://cdn1.example.com/video/500000/0.mp4v?size=medium

&Client=172.16.254.1&Expires=1357034400&Signature=nltfHRCrtziw02

RwPfDw_QI6&KeyId=APKA9ONS7QCOWEXAMPL 603, 604, 605, 606, 602

*Fig. 6*

```xml
<?xml version="1.0"?>
<MPD
  xmlns:xsi="http://www.w3.org/2001/XMLSchema-instance"
  xmlns="urn:mpeg:DASH:schema:MPD:2011"
  xsi:schemaLocation="urn:mpeg:DASH:schema:MPD:2011 DASH-MPD.xsd"
  type="dynamic"
  minimumUpdatePeriod="PT2S"
  timeShiftBufferDepth="PT30M"
  availabilityStartTime="2011-12-25T12:30:00"
  minBufferTime="PT4S"
  profiles="urn:mpeg:dash:profile:isoff-live:2011">

<BaseURL>http://cdn1.example.com/</BaseURL>
  <BaseURL>http://cdn2.example.com/</BaseURL>

<Period>
    <!-- Video -->
    <AdaptationSet
      mimeType="video/mp4"
      codecs="avc1.4D401F"
      frameRate="30000/1001"
      segmentAlignment="true"
      startWithSAP="1">
      <BaseURL>video/</BaseURL>
      <SegmentTemplate timescale="90000" initialization="$Bandwidth$/init.mp4v" media="$Bandwidth$/$Time$.mp4v">
        <SegmentTimeline>
          <S t="0" d="180180" r="432"/>
        </SegmentTimeline>
      </SegmentTemplate>
      <Representation id="v0" width="320" height="240" bandwidth="250000"/>
      <Representation id="v1" width="640" height="480" bandwidth="500000"/>
      <Representation id="v2" width="960" height="720" bandwidth="1000000"/>
    </AdaptationSet>
    <!-- English Audio -->
    <AdaptationSet mimeType="audio/mp4" codecs="mp4a.0x40" lang="en" segmentAlignment="0" startWithSAP="1">
      <SegmentTemplate timescale="48000" initialization="audio/en/init.mp4a" media="audio/en/$Time$.mp4a">
        <SegmentTimeline>
          <S t="0" d="96000" r="432"/>
        </SegmentTimeline>
      </SegmentTemplate>
      <Representation id="a0" bandwidth="64000" />
    </AdaptationSet>
    <!-- French Audio -->
    <AdaptationSet mimeType="audio/mp4" codecs="mp4a.0x40" lang="fr" segmentAlignment="0" startWithSAP="1">
      <SegmentTemplate timescale="48000" initialization="audio/fr/init.mp4a" media="audio/fr/$Time$.mp4a">
        <SegmentTimeline>
          <S t="0" d="96000" r="432"/>
        </SegmentTimeline>
      </SegmentTemplate>
      <Representation id="a0" bandwidth="64000" />
    </AdaptationSet>
  </Period>
</MPD>
```

*Fig. 7*

```xml
<?xml version="1.0"?>
<MPD
 xmlns:xsi="http://www.w3.org/2001/XMLSchema-instance"
 xmlns="urn:mpeg:DASH:schema:MPD:2011"
 xsi:schemaLocation="urn:mpeg:DASH:schema:MPD:2011 DASH-MPD.xsd"
 type="dynamic"
 minimumUpdatePeriod="PT2S"
 timeShiftBufferDepth="PT30M"
 availabilityStartTime="2011-12-25T12:30:00"
 minBufferTime="PT4S"
 profiles="urn:mpeg:dash:profile:isoff-live:2011">

<BaseURL>http://cdn1.example.com/</BaseURL>
 <BaseURL>http://cdn2.example.com/</BaseURL>

<Period>
  <!-- Video -->
  <AdaptationSet
    mimeType="video/mp4"
    codecs="avc1.4D401F"
    frameRate="30000/1001"
    segmentAlignment="true"
    startWithSAP="1">
   <BaseURL>video/</BaseURL>
   <SegmentTemplate timescale="90000" initialization="$Bandwidth%/init.mp4v"
 media="$Bandwidth$/$Time$.mp4v"
 tURLSigning="TemplateURL=http://cdn1.example.com/video/$Bandwidth$/$Time$.mp4v
 &Expires=1357034400&Signature=nitfHRCrtziwO2HwPfWw~yYDhUF5EwRunQA-
 j19DzZrvDh6hQ73lDx~ar3UocvvRQVw6EkC~GdpGQyyOSKQimTxAnW7d8F5Kkai9HVx0Flu5jcQb0UEmat
 EXAMPLE3ReXySpLSMj0yCd3ZAB4UcBCAqEijkytL6f3fVYNGQl6&KeyId=APKA9ONS7QCOWEXAMPL">
      <SegmentTimeline>
        <S t="0" d="180180" r="432"/>
      </SegmentTimeline>
    </SegmentTemplate>
    <Representation id="v0" width="320" height="240" bandwidth="250000"/>
    <Representation id="v1" width="640" height="480" bandwidth="500000"/>
    <Representation id="v2" width="960" height="720" bandwidth="1000000"/>
  </AdaptationSet>
  <!-- English Audio -->
  <AdaptationSet mimeType="audio/mp4" codecs="mp4a.0x40" lang="en" segmentAlignment="0" startWithSAP="1">
    <SegmentTemplate timescale="48000" initialization="audio/en/init.mp4a" media="audio/en/$Time$.mp4a">
      <SegmentTimeline>
        <S t="0" d="96000" r="432"/>
      </SegmentTimeline>
    </SegmentTemplate>
    <Representation id="a0" bandwidth="64000" />
  </AdaptationSet>
  <!-- French Audio -->
  <AdaptationSet mimeType="audio/mp4" codecs="mp4a.0x40" lang="fr" segmentAlignment="0" startWithSAP="1">
    <SegmentTemplate timescale="48000" initialization="audio/fr/init.mp4a" media="audio/fr/$Time$.mp4a">
      <SegmentTimeline>
        <S t="0" d="96000" r="432"/>
      </SegmentTimeline>
    </SegmentTemplate>
    <Representation id="a0" bandwidth="64000" />
  </AdaptationSet>
 </Period>
</MPD>
```

TEMPLATE UNIFORM RESOURCE LOCATOR SIGNING

CROSS-REFERENCE TO RELATED APPLICATIONS

The present application claims priority to U.S. Provisional Patent Application 62/182,043 filed Jun. 19, 2015, by Xin Wang, et al., and entitled "Template Uniform Resource Locator Signing," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Dynamic Adaptive Streaming over Hypertext Transfer Protocol (HTTP) (DASH) standard enables high quality streaming of media content over the Internet from conventional web servers. DASH divides content into a sequence of small segments, with each segment containing some interval of playback. Content over the same time period is provided in a plurality of bit rates, and a DASH client automatically selects the segment with the highest possible bit rate that can be played without causing stalls or re-buffering of the playback. As a result, the DASH client seamlessly adapts to variations in network conditions and provides high quality playback without stalls or re-buffering.

DASH has been adopted and published as International Organization for Standardization/International Electrotechnical Commission (ISO/IEC) 23009-1:2012 entitled "Information Technology—Dynamic Adaptive Streaming over HTTP (DASH) part 1: Media Presentation Description and Segment Formats," which is incorporated herein by reference.

SUMMARY

Content and service providers need to restrict access to content and limit viewing times in order to protect assets and fulfill licensing obligations, for example. Because Uniform Resource Locators (URLs) are inherently open, users, even those authenticated at the portal, can potentially share or expose content URLs with other unauthorized users, or pre-fetch or retain copies of these URLs to access the content outside of an authorized time interval. In other situations, illegal content aggregators can exploit these open URLs to aggregate and re-distribute content without adhering to terms of the original content portals. URL signing is an effective mechanism for controlling access to URL-addressed content. In particular, URL signing using a URL template can be used to restrict access to content components accessible via URLs, and to control access to the components based on expiration dates and times that limit when content can be accessed.

In one embodiment, the disclosure includes an apparatus including a memory configured to store content items, and a processor operably coupled to the memory and configured to generate Uniform Resource Locator (URL) signing information based on a segment URL scope descriptor. The segment URL scope descriptor authorizes a client to access a set of the content items.

In an embodiment, the URL signing information is signaled to the client in a media presentation description (MPD). In an embodiment, the URL signing information comprises the segment URL scope descriptor, a condition for access control, key information, and a signature. In an embodiment, the segment URL scope descriptor is a URL template. In an embodiment, the segment URL scope descriptor is a path pattern sequence (PPS) element. In an embodiment, the processor is further configured to determine the set of the content items that the client is allowed to access. In an embodiment, the processor is further configured to generate the URL signing information by determining an access condition. In an embodiment, the condition for access control comprises at least one of an expiration time and a client identifier. In an embodiment, the URL signing information comprises at least one of the segment URL scope descriptor and an access condition. In an embodiment, the URL signing information further comprises a signature and a key identification (ID), and the signature is generated using a signing algorithm based on the segment URL scope descriptor and an access condition. In an embodiment, the key ID corresponds to a private key used to generate the signature, and a public key used to validate the URL signing information. In an embodiment, the key ID corresponds to a symmetrical key used to generate both the signature and to validate the URL signing information. In an embodiment, the set of the content items have a content property. In an embodiment, the content property comprises at least one of a bitrate, a resolution, and a quality level. In an embodiment, the content property adapts to a network condition, and the network condition comprises at least one of a bandwidth and a power consumption rate. In an embodiment, a request for the content items from the client is verified by a trusted party. In an embodiment, the content item is a segment in Dynamic Adaptive Streaming over Hypertext Transfer Protocol (HTTP) (DASH).

In another embodiment, the disclosure includes a method for authorizing a request for content items including receiving a request for the content items comprising a Uniform Resource Locator (URL) and signing information, wherein the content items are stored in memory and the signing information comprises a URL template and an access condition, verifying the request based on the signing information, and providing access to a set of the content items for a party associated with the request when the request is verified.

In an embodiment, the signing information further comprises a signature and a key identification (ID), and the signature is generated using a signing algorithm based on the URL template, the access condition, and the key ID. In an embodiment, the key ID corresponds to a private key used to generate the signature, and a public key used to verify the request. In an embodiment, the key ID corresponds to a symmetrical key used to generate the signature and verify the request. In an embodiment, the method includes validating the signing information is based on the signature in the signing information. In an embodiment, the method includes validating that an access condition has been satisfied. In an embodiment, validating that a requested resource is in an allowed set by matching the URL received against a URL template in the signing information. In an embodiment, the content items are segments in Dynamic Adaptive Streaming over Hypertext Transfer Protocol (HTTP)

(DASH). In an embodiment, the access condition comprises an Internet Protocol (IP) address.

In yet another embodiment, the disclosure includes a method for generating a request URL including receiving Uniform Resource Locator (URL) signing information from a content server, selecting a segment to request, constructing a URL pointing to the segment, sending a request for the segment to a Hypertext Transfer Protocol (HTTP) server using a URL and the URL signing information, and receiving the segment when the URL of the segment is validated against the URL signing information.

In an embodiment, the URL signing information is included in a media presentation description (MPD) received from the content server, and wherein the URL pointing to the segment is constructed based on information in the MPD. In an embodiment, the URL signing information comprises a segment URL scope descriptor and an access condition. In an embodiment, the URL signing information further comprises a signature and a key identification (ID), and the signature is generated using a signing algorithm based on a template URL and an access condition. In an embodiment, the URL signing information further comprises a value representing a time that authorization will expire.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 7 is an example of coding corresponding to a SegmentTemplate-based MPD example.

FIG. 8 is an example of coding for an MPD.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A Uniform Resource Indicator (URI) Signing Core Experiment (CE) is described in "Descriptions of Core Experiments on DASH Amendment," MPEG#111, w15215, Geneva, Switzerland, February 2015, which is incorporated herein by reference. As a contribution to the URI Signing CE, disclosed herein is an extension to the partial Uniform Resource Locator (URL) signing solution proposed in "Adaptation of URL Signing in DASH—Partial URL Signing," m33271, Valencia, Spain, April 2014, which is incorporated herein by this reference, and a corresponding signaling mechanism within DASH media presentation description (MPD). The extension is consistent with the thoughts on URL signing, as provided in "Thoughts on URI Signing in MPEG DASH," m34320, Sapporo, Japan, July 2014, which is incorporated herein by this reference, on using URI signatures as tokens to protect DASH content in a standard manner. A detailed description of partial URL signing is found in U.S. Pub. No. 2015/0271179 by Xin Wang, et. al, filed Mar. 24, 2015, and titled "System and Method for Partial URL Signing with Applications to Dynamic Adaptive Streaming," which is incorporated herein by reference.

The extension is to allow the partial URL signing to create a signature by including an additional DASH segment URL template and to verify segment request URLs against the template in the signature. The signaling mechanism is to signal or even carry the signature within an MPD for those segment URLs that the template covers and indicate that the signature should be submitted as part of the segment requests corresponding to the URLs. This is a rather simple and very useful solution, especially when the (e.g., single) signature is invariant with respect to a (e.g., large) collection of segment URLs within the MPD.

For the purpose of convenience, the proposal described herein is discussed using URLs in the context of DASH, rather than more general URIs. However, the proposal applies equally to URIs, and the DASH segment URL template may be substituted with other types of URI/URL templates such as those defined in Internet Engineering Task Force (IETF) Request for Comments (RFC) 6570, "URI Template," March 2012, which is incorporated herein by this reference. By way of example, "DASH-IF Implementation Guidelines: Authentication and Authorization Information Signaling and Exchange Mechanisms (AAISEM)," published May 4, 2016, which is incorporated herein by reference, explains how to apply URI signing to segment based content in DASH. In Section 5.1, a path pattern sequence (PPS) element is used for signing and to indicate the pattern to be matched for validating a requested URL. The PPS element and the template URL, which both contain a set of URLs, may be collectively referred to herein as a segment URL scope descriptor.

Also, note that the data model of an MPD is mainly described in terms of period, adaptation set, representation and segment, in a containing relationship. Two basic manners to specify URLs for segments are: SegmentList and SegmentTemplate. The former enumerates a list of segment URLs, whereas the latter provides a template-based URL construction mechanism which allows specification of a template containing specific identifiers that are substituted by dynamic values assigned to segments, to represent a list of segments. It is clear that signing a list of segment (explicit) URLs is rather straightforward using a conventional URI/URL signing mechanism, such as the one in IETF document, "URI Signing for CDN Interconnection (CDNI)," Jun. 1, 2015, which is incorporated herein by this reference, to sign each individual URLs in the list. Therefore, the proposal below focuses on dealing with signing segment URLs specified using Segment_Template. Nevertheless, if the list of URLs could be more conveniently specified (captured or covered) using a URL template, the proposal below would also apply. Moreover, signaling signing information for the list of URLs can also be achieved using the signaling options discussed below.

Figure 1:
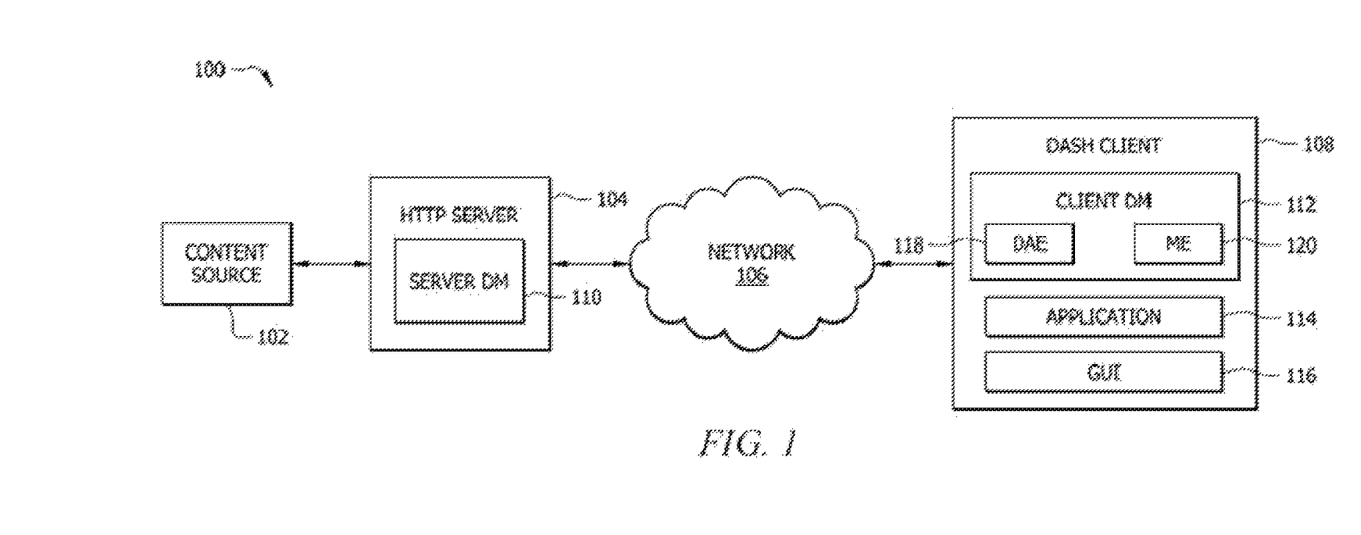
FIG. 1 is a schematic diagram of a DASH system.

FIG. 1 is a schematic diagram of an embodiment of a DASH system 100. The DASH system 100 may generally comprise a content source 102, an HTTP server 104, a network 106, and one or more DASH clients 108. In such an embodiment, the HTTP server 104 and the DASH client 108 may be in data communication with each other via the network 106. Additionally, the HTTP server 104 may be in data communication with the content source 102. In some embodiments, the DASH system 100 may further comprise one or more additional content sources 102 and/or HTTP servers 104. The network 106 may comprise any network configured to provide data communication between the HTTP server 104 and the DASH client 108 along wired and/or wireless channels. For example, the network 106 may be an Internet or mobile telephone network. Descriptions of the operations performed by the DASH system 100 may generally refer to instances of one or more DASH clients 108. It is noted that the use of the term DASH throughout the disclosure may include any adaptive streaming, such as HTTP Live Streaming (HLS), Microsoft Smooth Streaming, or Internet Information Services (IIS), and may not be constrained to represent only third generation partnership (3GP)-DASH or moving picture experts group (MPEG)-DASH.

The content source 102 may be a media content provider or distributer which may be configured to deliver various media contents to subscribers or users using different encryption and/or coding schemes suited for different devices (e.g., television, notebook computers, and/or mobile handsets). The content source 102 may be configured to support a plurality of media encoders and/or decoders (e.g., codecs), media players, video frame rates, spatial resolutions, bitrates, video formats, or combinations thereof. Media content may be converted from a source or original presentation to various other representations to suit different users.

The HTTP server 104 may be any network node, for example, a computer server that is configured to communicate with one or more DASH clients 108 via HTTP. The HTTP server 104 may comprise a server DASH module (DM) 110 configured to send and receive data via HTTP. In one embodiment, the HTTP server 104 may be configured to operate in accordance with the DASH standard described in ISO/IEC 23009-1. The HTTP server 104 may be configured to store media content (e.g., in a memory or cache) and/or to forward media content segments. Each segment may be encoded in a plurality of bitrates and/or representations. The HTTP server 104 may form a portion of a content delivery network (CDN), which may refer to a distribution system of servers deployed in multiple data centers over multiple backbones for the purpose of delivering content. A CDN may comprise one or more HTTP servers 104. Although FIG. 1 illustrates an HTTP server 104, other DASH servers such as origin servers, web servers, and/or any other suitable type of server may store media content.

A DASH client 108 may be any network node, for example, a hardware device that is configured to communicate with the HTTP server 104 via HTTP. A DASH client 108 may be a notebook computer, a tablet computer, a desktop computer, a mobile telephone, or any other device. The DASH client 108 may be configured to parse an MPD to retrieve information regarding the media content, such as timing of the program, availability of media content, media types, resolutions, minimum and/or maximum bandwidths, existence of various encoded alternatives of media components, accessibility features and required digital right management (DRM), location of each media component (e.g., audio data segments and video data segments) on the network, and/or other characteristics of the media content. The DASH client 108 may also be configured to select an appropriate encoded version of the media content according to the information retrieved from the MPD and to stream the media content by fetching media segments located on the HTTP server 104. A DASH client 108 may comprise a client DM 112, an application 114, and a graphical user interface (GUI) 116. The client DM 112 may be configured to send and receive data via HTTP and a DASH protocol (e.g., ISO/IEC 23009-1). The client DM 112 may comprise a DASH access engine (DAE) 118 and a media output (ME) 120. The DAE 118 may be configured as the primary component for receiving raw data from the HTTP server 104 (e.g., the server DM 110) and constructing the data into a format for viewing. For example, the DAE 118 may format the data in MPEG container formats along with timing data, then output the formatted data to the ME 120. The ME 120 may be responsible for initialization, playback, and other functions associated with content and may output that content to the application 114.

The application 114 may be a web browser or other application with an interface configured to download and present content. The application 114 may be coupled to the GUI 116 so that a user associated with the DASH client 108 may view the various functions of the application 114. In an embodiment, the application 114 may comprise a search bar so that the user may input a string of words to search for content. If the application 114 is a media player, then the application 114 may comprise a search bar so that the user may input a string of words to search for a movie. The application 114 may present a list of search hits, and the user may select the desired content (e.g., a movie) from among the hits. Upon selection, the application 114 may send instructions to the client DM 112 for downloading the content. The client DM 112 may download the content and process the content for outputting to the application 114. For example, the application 114 may provide instructions to the GUI 116 for the GUI 116 to display a progress bar showing the temporal progress of the content. The GUI 116 may be any GUI configured to display functions of the application 114 so that the user may operate the application 114. As described above, the GUI 116 may display the various functions of the application 114 so that the user may select content to download. The GUI 116 may then display the content for viewing by the user.

Figure 2:
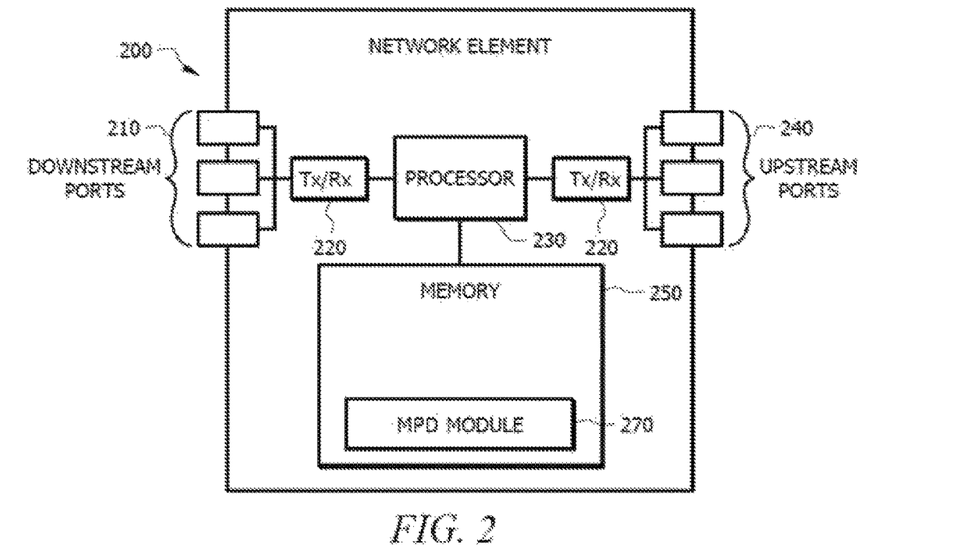
FIG. 2 is a schematic diagram of a network element that may be used to transport and process data traffic through at least a portion of the DASH system of FIG. 1.

FIG. 2 is a schematic diagram of an embodiment of a network element 200 that may be used to transport and process data traffic through at least a portion of a DASH system 100 shown in FIG. 1. For example, network element 200 may be, or incorporated with, an HTTP server 104 or a DASH client 108 as described in FIG. 1. At least some of the features/methods described in the disclosure may be implemented in the network element. For instance, the features/methods of the disclosure may be implemented in hardware, firmware, and/or software installed to run on the hardware. The network element 200 may be any device (e.g., a server, a client, a base station, a user-equipment, a mobile communications device, etc.) that transports data through a network, system, and/or domain. Moreover, the terms network "element," "node," "device," "component," "module," and/or similar terms may be interchangeably used to generally describe a network device and do not have a particular or special meaning unless otherwise specifically stated and/or claimed within the disclosure. In one embodiment, the network element 200 may be an apparatus configured to communicate quality information within metadata, to implement DASH, and/or to establish and communicate via an HTTP connection.

The network element 200 may comprise one or more downstream ports 210 coupled to a transceiver (Tx/Rx) 220, which may be transmitters, receivers, or combinations thereof. The Tx/Rx 220 may transmit and/or receive frames from other network nodes via the downstream ports 210. Similarly, the network element 200 may comprise another Tx/Rx 220 coupled to a plurality of upstream ports 240, wherein the Tx/Rx 220 may transmit and/or receive frames from other nodes via the upstream ports 240. The downstream ports 210 and/or the upstream ports 240 may include electrical and/or optical transmitting and/or receiving components. In another embodiment, the network element 200 may comprise one or more antennas coupled to the Tx/Rx 220. The Tx/Rx 220 may transmit and/or receive data (e.g., packets) from other network elements wirelessly via one or more antennas.

A processor 230 may be coupled to the Tx/Rx 220 and may be configured to process the frames and/or determine which nodes to send (e.g., transmit) the packets. In an embodiment, the processor 230 may comprise one or more multi-core processors and/or memory modules 250, which may function as data stores, buffers, etc. The processor 230 may be implemented as a general processor or may be part of one or more application specific integrated circuits (ASICs), field-programmable gate arrays (FPGAs), and/or digital signal processors (DSPs). Although illustrated as a single processor, the processor 230 is not so limited and may comprise multiple processors. The processor 230 may be configured to implement any of the adaptation schemes to communicate and/or signal metadata information.

FIG. 2 illustrates that a memory module 250 may be coupled to the processor 230 and may be a non-transitory medium configured to store various types of data. Memory module 250 may comprise memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory module 250 may be used to house the instructions for carrying out the system and methods described herein. In one embodiment, the memory module 250 may comprise an MPD module 270 that may be implemented on the processor 230. In one embodiment, the MPD module 270 may be implemented on the HTTP server 104 or on the DASH client 108 of FIG. 1 and accessed or utilized to perform all or portions of the disclosed methods or processes. Alternatively, the MPD module 270 may be implemented in processor 230 or using any other means.

It is understood that by programming and/or loading executable instructions onto the network element 200, at least one of the processor 230, the cache, and the long-term storage are changed, transforming the network element 200 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 3:
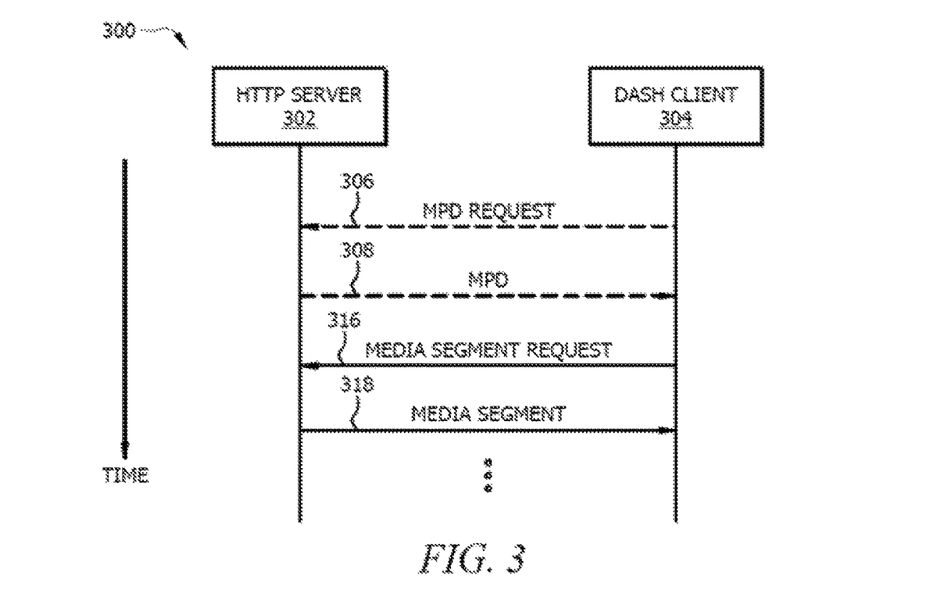
FIG. 3 is a protocol diagram providing an example of DASH communications between an HTTP server and a DASH client from the DASH system of FIG. 1.

FIG. 3 is a protocol diagram providing an example of DASH communications between an HTTP server 302 and a DASH client 304. The HTTP server 302 may be similar to the HTTP server 104 and the DASH client 304 may be similar to the DASH client 108. While not shown in FIG. 3, the HTTP server 302 may receive media content from a content source (e.g., content source 102 as described in FIG. 1) and/or may generate media content. For example, the HTTP server 302 may store media content in memory and/or a cache.

At step 306, the DASH client 304 sends an MPD request to the HTTP server 302. The MPD comprises, for example, instructions for downloading, or receiving, segments of data content and metadata information from the HTTP server 302. At step 308, the HTTP server 302 sends an MPD to the DASH client 304 via HTTP in response to the MPD request in step 306. In other embodiments, the HTTP server 302 delivers the MPD via HTTP secure (HTTPS), email, universal serial bus (USB) drives, broadcast, or any other type of data transport. Specifically in FIG. 3, the DASH client 304 may receive the MPD from the HTTP server 302 via the DAE (e.g., DAE 118 as described in FIG. 1), and the DAE may process the MPD in order to construct and/or issue requests from the HTTP server 302 for metadata content information and data content segments.

At step 316, the DASH client 304 requests a media segment from the HTTP server 302. For example, as instructed by the MPD, the DASH client 304 sends a media segment request for a media segment to the HTTP server 302 via the DAE. At step 318, in response to receiving the media segment request, the HTTP server 302 sends a media segment to the DASH client 304. The DASH client 304 may receive, process, and/or format the media segment. The media segment may be presented (e.g., visually and/or audibly) to a user. For example, after a buffering period, an application (e.g., application 114 as described in FIG. 1) may present the media segment for viewing via a GUI (e.g., GUI 116 as described in FIG. 1). The DASH client 304 may continue to send and/or receive metadata information and/or media segments to/from the HTTP server 302, similar to as previously disclosed with respect to steps 306-318.

Figure 4:
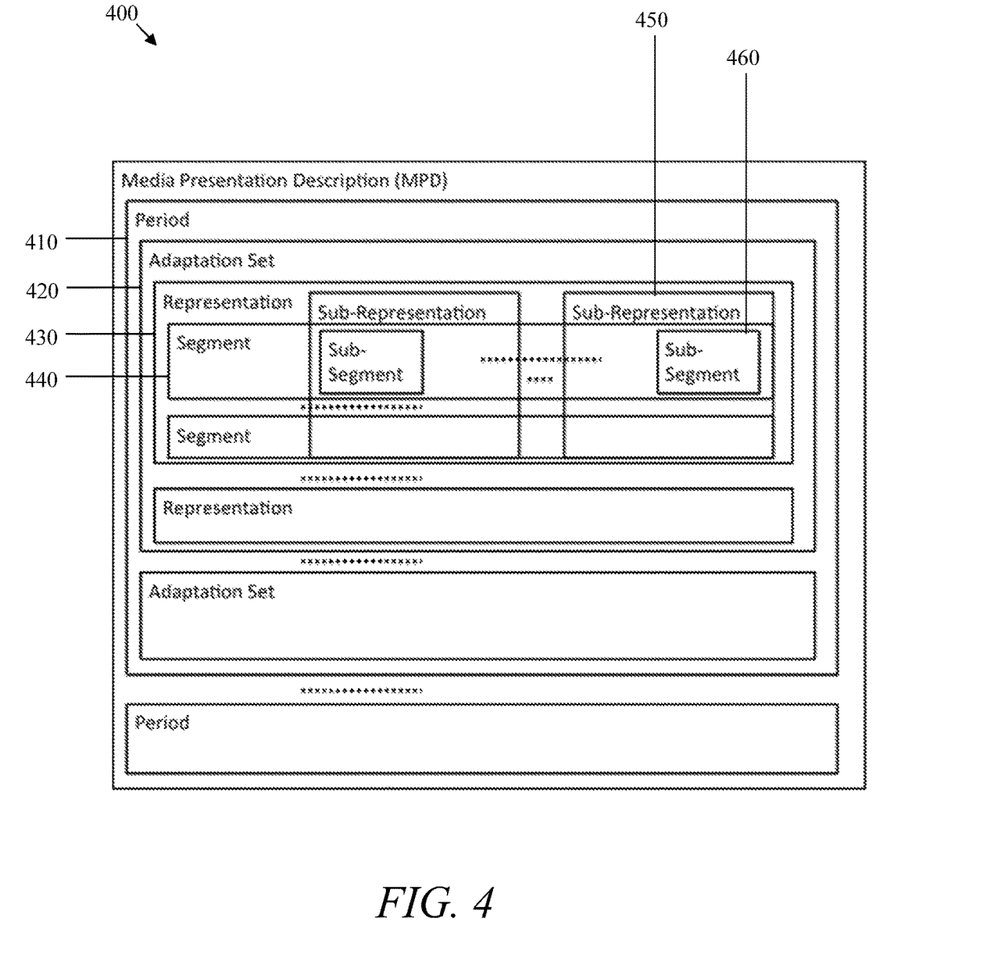
FIG. 4 is diagram of an example of a media presentation description (MPD).

FIG. 4 is a diagram of an example of an MPD 400 that may be exchanged between a server and a client (e.g., HTTP server 302 and DASH client 304). The MPD 400 may comprise Period 410, Adaptation Set 420, Representation 430, Segment 440, Sub-Representation 450, and Sub-Segment 460 elements. For example, the Segment 440 may be an element of the MPD 400 that is associated with a segment, the latter of which may be a unit of data. Similarly, the Period 410 may be associated with a period of data. In 23009-1, the MPD 400 may be referred to as a "formalized description for a [m]edia [p]resentation for the purpose of providing a streaming service." A media presentation, in turn, may be referred to as a "collection of data that establishes a . . . presentation of media content." In particular, the MPD 400 may define formats to announce HTTP URLs, or network addresses, for downloading segments of data. A segment may be referred to as a unit of data associated with a URL. In other words, a segment may generally be the largest unit of data that can be retrieved with a single HTTP request using a single URL. The MPD 400 may be an Extensible Markup Language (XML) document.

In short, the MPD 400 may comprise a plurality of URLs, or metadata used by the client 108 to construct a plurality of URLs, pointing to one or more HTTP servers 104 for downloading segments of data. For example, referring to FIG. 3, the DASH client 304 may receive a plurality of URLs in the MPD at step 308. A first URL may be associated with the first segment and point to the HTTP server 302 (or another content source) so that the DASH client 304 requests and receives the first segment from the HTTP server 302. A second URL may be associated with ad content and point to, for example, an ad server (not shown) so that the DASH client 304 requests and receives ad content. The process may continue until the DASH client 304 requests and receives content from the HTTP server 302 associated with the last URL.

Referring back to FIG. 4, it can be seen that the MPD 400 is a hierarchical data model. In 23009-1, the Period 410 may typically represent "a media content period during which a consistent set of encoded versions of the media content is available." In other words, the "set of available bitrates, languages, captions, subtitles, etc. does not change during a [p]eriod." The Representation 430 may describe "a deliverable encoded version of one or several media content components." The DASH client 304 "may switch from Representation to Representation . . . in order to adapt to network conditions or other factors." The adaptability of DASH therefore lies among a set of mutually interchangeable Representations 430. The DASH client 304 may determine if it can support a specific Representation 430. If not, then the DASH client 304 may select a different Representation 430 that it can support. The DASH client 304 may then begin downloading each segment within the selected Representation until the DASH client 304 ceases downloading or until the DASH client 304 selects another Representation 430.

The Period 410, Adaptation Set 420, Representation 430, Segment 440, Sub-Representation 450, and Sub-Segment 460 elements describe data. Each element may comprise one or more attributes, which are like properties of the element in that they provide further definition about the element. Elements and attributes are defined in Extensible Markup Language (XML) 1.0, Fifth Edition, 2008, which is incorporated herein by reference. In this text, attributes may be prefixed with the @ symbol. For example, the Period 410 may comprise an @start attribute that may specify when on a presentation timeline a period associated with the Period 410 begins. In addition, the Period 410 may comprise an @duration attribute that may specify the duration of a period associated with the Period 410. The Adaptation Set 420, Segment 440, Sub-Representation 450, and Sub-Segment 460 elements are described in 23009-1 and do not need further explanation herein.

To provide context, the notion of segment URL templates is initially reviewed. Thereafter, the signing, verifying, and signaling mechanisms are proposed.

In web-based content distribution, requests for content from client devices to content portals are typically in the form of content URLs (or more generally URIs). Very often content and service providers need to restrict access to content and limit viewing times in order to protect assets and fulfill licensing obligations, for example. Because URLs are inherently open, users, even those authenticated at the portal, can potentially share or expose content URLs with other unauthorized users, or pre-fetch or retain copies of these URLs to access the content outside of an authorized time interval. In other situations, illegal content aggregators can exploit these open URLs to aggregate and re-distribute content without adhering to terms of the original content portals.

URL signing is an effective mechanism for controlling access to URL-addressed content. In particular, URL signing can be used to restrict access to content components accessible via URLs, and control access to the components based on conditions such as expiration dates, times that limit when content can be accessed, a client identifier that limits which content can be accessed, and so on.

To achieve these objectives, URL signing can append to a base URL with the following query parameter values:
1. a client IP address of the user for whom the content access is authorized,
2. an expiry timestamp to ensure that the content expires after a predetermined time, and
3. a digital signature over the base URL, the IP address and the timestamp.

These values can then be validated against an actual client sending in a URL request and the current time at a trusted party (e.g., content server) that is to validate and/or serve the request.

For example, the following is a base URL for a video segment "0.mp4v" having a bit rate of 50 kilobytes per second (Kbps) with a query parameter size of "medium":
http://cdn1.example.com/video/500000/0.mp4v?size=medium It can be signed as follows, resulting in a signed URL:

http://cdn1.example.com/video/500000/0.mp4v?size=medium
&Client=172.16.254.1&Expires=1357034400&Signature=nitfHRCrtziwO2HwPf
Ww~yYDhUF5EwRunQA-j19DzZrvDh6hQ73lDx~-
ar3UocvvRQVw6EkC~GdpGQyyOSKQim-TxAnW7d8F5Kkai9HVx0FIu-
5jcQb0UEmatEXAMPLE3ReXySpLSMj0yCd3ZAB4UcBCAqEijkytL6f3fVYNG
QI6&KeyId=APKA9ONS7QCOWEXAMPL where the new query parameters Client, Expires, Signature, and KeyID constitute the URL signing information, and indicate a client IP address, an expiration date and time, a signature over the URL string, and an ID of the key used to create the signature, respectively.

Upon receiving a signed URL, validation can be carried out by a trusted party to determine if the actual request client is indeed the one specified by the Client field, the current time is not beyond the expiration time indicated by Expires, and the signature can be verified (e.g., using the key identified by KeyID). If any of these validations fails, the request is not legitimate and should be denied.

Figure 5:
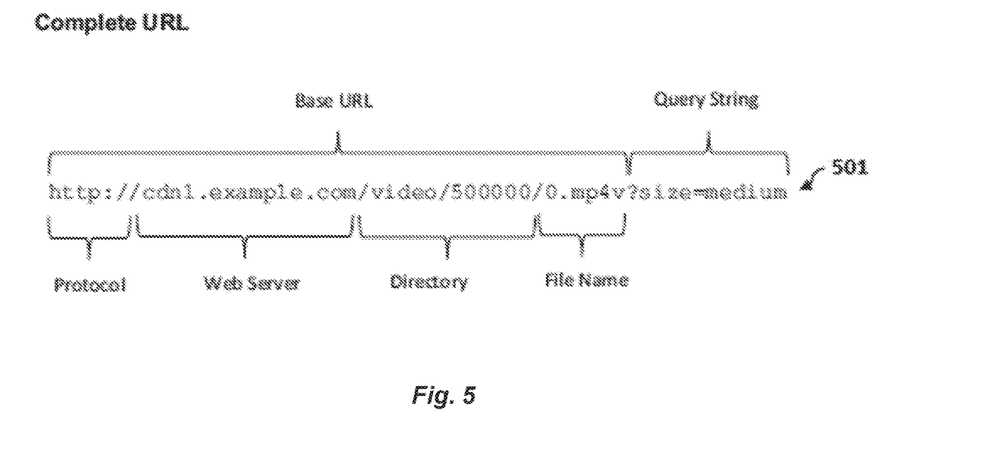
FIG. 5 is an example of a complete Uniform Resource Locator (URL) comprising a base URL and a query string.
Figure 6:
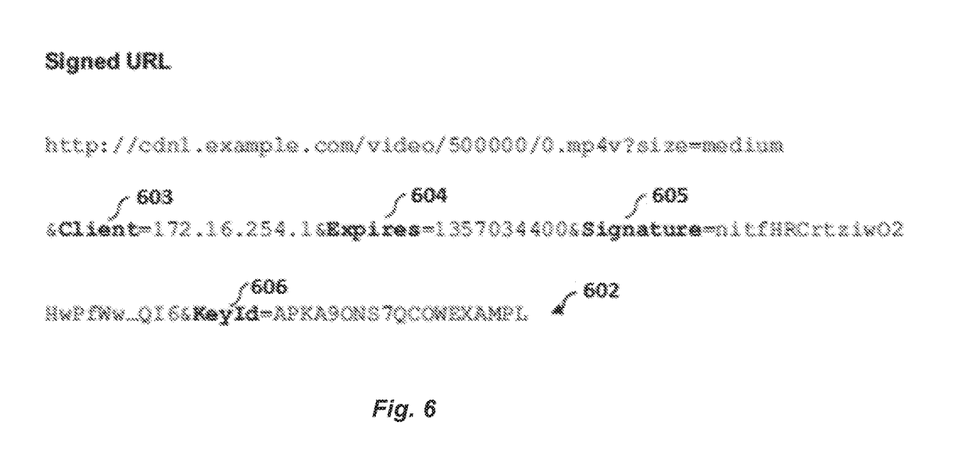
FIG. 6 is an example of a signed URL based on the complete URL of FIG. 5.

FIG. 5 illustrates an example of a complete URL 501 comprising a base URL and a query string. The complete URL 501 may be exchanged between a server and a client (e.g., HTTP server 302 and DASH client 304). The base URL is comprised of a protocol (e.g., http, https, ftp, rtp, etc.), an address of a web server, a directory path, and a file name. FIG. 6 illustrates an exemplary signed URL 602 based on the complete URL 501. The signed URL 602 comprises a base URL and a query string as before, and also includes signing information used for access control and/or verification purposes. The signing information comprises client string 603, expires value 604, signature string 605, and keyID string 606.

URL signing has been considered in the context of CDNs and Content Delivery Networks interconnection (CDNi). In CDNi deployment, a signed URL is assumed to be provided by a content service provider to a user client during website or content navigation. When trying to access content, the user's URL request is redirected by the Authoritative CDN and routed via a hierarchy of CDNs from the user client to a surrogate of the Delivering CDN, where the signed URL validation is made before content delivering. Different configurations in a CDNi hierarchy and signature key distribution result in different URL signing models and schemes.

How and when to deliver the signed URLs for a large number of base URLs in an efficient and scalable manner make the direct application of URL signing to DASH using MPD considerably difficult.

As noted above, the data model of an MPD is mainly described in terms of periods, adaptation sets, representations and segments. There are two basic ways to specify URLs for segments: Segment Lists and Segment Templates. Segment Lists enumerate a list of segment URLs, whereas Segment Templates provide a template-based URL construction mechanism which allows specification of a template containing specific identifiers that are substituted by dynamic values assigned to segments, to represent a list of segments.

Using a Segment Template is more compact and effective, especially when dealing with live streaming content which makes it infeasible to specify a (finite) list of segments at the time of MPD creation.

The segment URL templates are specified in Clause 5.3.9.4 of ISO/IEC 23009-1. With the SegmentTemplate element, and the "template-based segment URL construction" rule, the segment URL templates may be used as a checking algorithm to verify that a URL is constructed by a segment URL template.

For example, in the following SegmentTemplate-based MPD, assuming that the first BaseURL element and the video representation with identification "v1" are selected, the template results in:
http://cdn1.example.com/video/$Bandwidth$/$Time$.mp4v, and the segment list starting at number 0 results in the following segment URLs:

http://cdn1.example.com/video/500000/0.mp4v
http://cdn1.example.com/video/500000/180180.mp4v
http://cdn1.example.com/video/500000/360360.mp4v
http://cdn1.example.com/video/500000/540540.mp4v
http://cdn1.example.com/video/500000/720720.mp4v
...

The coding corresponding to this example is shown in FIG. 7.

The template URL signing is very much like URL signing, except that it now signs over a URL template.

Assume that there is a URL signing algorithm. One can extend it to a template URL signing algorithm as follows. Given a URL template T, some access control query string C, and key information parameter K, the template URL signature S and signing information I are:

$S=\text{sign}[T,C],$ where sign is the URL signing algorithm, and $I=T\&C\&S\&K$ Using the URL template described above, the following example of template URL signing information I can be constructed, with TemplateURL as the parameter name for the URL template to be signed (whose value is not encoded, just for the illustration purpose):

TemplateURL="http://cdn1.example.com/video/$Bandwidth$/$Time$.mp4v"&Client
=172.16.254.1&Expires=1357034400&Signature=nitfHRCrtziwO2HwPfWw~yYDh
UF5EwRunQA-j19DzZrvDh6hQ73lDx~ar3UocvvRQVw6EkC~GdpGQyyOSKQim-
TxAnW7d8F5Kkai9HVx0FIujcQb0UEmatEXAMPLE3ReXySpLSMj0yCd3ZAB4U
cBCAqEijkytL6f3fVYNGQI6&KeyIdAPKA9ONS7QCOWEXAMPL With regard to template URL verifying, similar to URL verifying employed by URL signing, template URL verifying is a process that checks template URL signing information against an actual URL request, together with some trusted information (such as client's Internet Protocol (IP) address and the date and time information at a trusted party), except that it will check if the actual segment request URL can be derived from the URL template included in the signing information, according to the "template-based segment URL construction" rule. For instance, the example segment URLs described above may be verified against the URL template used to derive them.

With regard to the signaling of template URL signatures, it should be recognized that signaling occurs in two directions, from a sever to a client (e.g., HTTP server 302 and DASH client 304) and from a client to a server. In the direction from a server to a client, the MPD may be used to convey the signing information. Because template URL signing corresponds to individual URL templates, template URL signing information I can be signaled or even carried in where its corresponding segment URL template is defined, using either a descriptor or one or more attributes to the SegmentTemplate element, for instance.

Next, the option of template URL signing attribute is discussed. In this option, a new attribute @tURLSigning is introduced to the SegmentTemplate element to carry a template URL signing information value. After the client constructs or selects a segment URL, it appends the signing information at the end and makes the request using the appended URL. This allows the segment URL to be verified against the signing information value on a URL signature verification server. Instead of using the MPD, it should be recognized that signaling the template signing information to the client may also be done via a cookie or HTTP header appended as part of an HTTP response from an HTTP server to the client.

In the following example MPD, video segments are template URL signed and hence access to these segments are under control, whereas audio segments are not template URL signed and are not under access control. The coding for this example MPD is illustrated in FIG. 8.

Next, the option of template URL signing descriptors is discussed. In this option, the attribute @tURLSigning can be put into an EssentialDescriptor within the SegmentTemplate. An advantage of this option is on the backward compatibility; namely, if the client does not recognize this descriptor, then the containing SegmentTemplate will be removed, resulting in a level of enforcement of honoring the template URL signing.

It should be recognized that signaling information occurs in two directions or bi-directionally. In the direction from server to client, the MPD is used to convey the signing information, either an attribute in the URLTemplate element or a Partial URL Signing Descriptor. The signing information may also be conveyed using a query parameter to carry the template URL signing information to the other party. The template URL signing information may be used by both the server and the client in a response or in a request, respectively.

In the other direction from a server to a client, there is an option to use a URL query parameter to carry the signing information. Because template URL signing information is like URL signing information and both take the form of URL query parameters, these query parameters can be inserted using the generic descriptor mechanism specified in Working Draft (WD) of ISO/IEC 23009-1, Amd 2, "Information technology—Dynamic adaptive streaming over HTTP (DASH)—Part 1: Media presentation description and delivery formats," January 2014, which is incorporated herein by this reference, for defining static, dynamic, mandatory and optional query parameter insertions. While a uni-directional signaling mechanism of the template URL signing information between a client and server has been discussed, it should be recognized that both a server and a client can use a HTTP cookie or an HTTP header to carry the URL signing information to the other party, the former in a response and the later in a request.

Thus, an access control (or authorization) mechanism, template URL signing, is proposed. It is more suitable to DASH as it relies on the existing DASH notion of segment URL templates. It avoids URL signing for each segment, and has the flexibilities of controlling access over a collection of segments, segments from different domains, and even different protocols.

Figure 9:
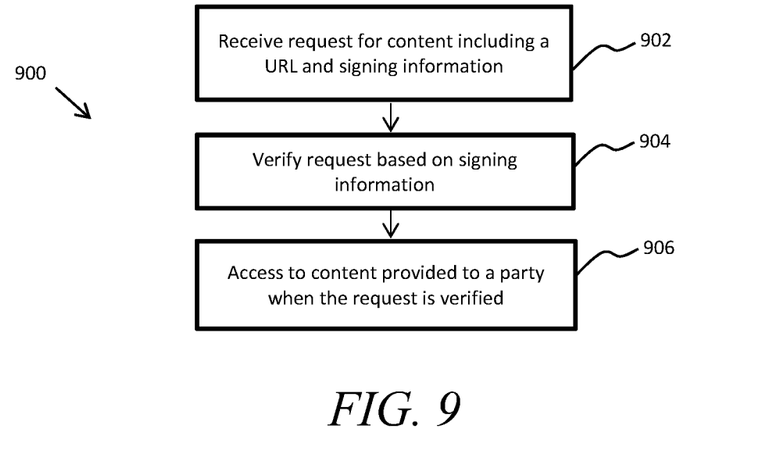
FIG. 9 is a flowchart of a method of authorizing a request for content.

FIG. 9 is flowchart of a method 900 of authorizing a request for content. The method 900 may be implemented between a server and a client such as HTTP server 302 and DASH client 304. The method 900 may be implemented when a client sends a request for content to the server. In block 902, a request for content comprising a URL and signing information is received. The content may be, for example, one or more segments of media content (e.g., a video file, an audio file, etc.). In an embodiment, the signing information includes a URL template and an access condition. The content may be stored in memory (e.g., memory 250). At block 904, the request is verified based on the signing information. In other words, the request is validated by comparing at least a part of the request to the signing information. In block 906, access to the content is provided to a party (e.g., client) associated with the request when the request is verified. If the request is not verified (or validated), the content is not provided.

Figure 10:
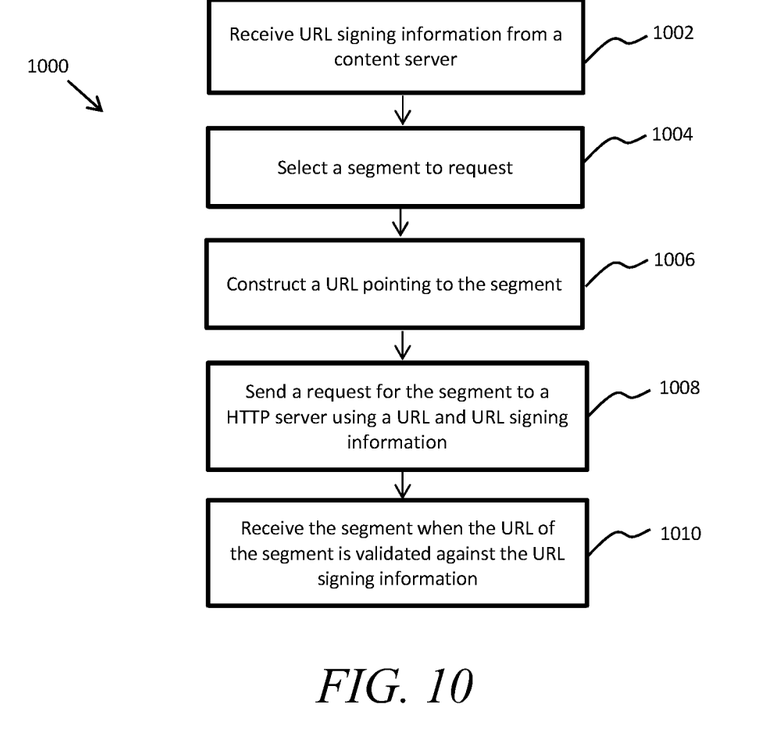
FIG. 10 is a flowchart of a method for generating a request URL.

FIG. 10 is flowchart of a method 1000 for generating a request URL. The method 1000 may be implemented between a server and a client such as HTTP server 302 and DASH client 304. The method 1000 may be implemented when an MPD has been requested by and transmitted to a client. In an embodiment, the MPD is provided to the client by a server such as the HTTP server 302. In block 1002, URL signing information is received from a content server. The content server may be, for example, a content source such as content source 102 in FIG. 1. In block 1004, a segment to request is selected. The segment may be part or portion of media content (e.g., a video file, an audio file, etc.). In block 1006, a URL pointing to the segment is constructed. In an embodiment, the URL may be referred to a pointer. In an embodiment, the URL may be based on information included in the MPD. In block 1008, a request for the segment is sent to a HTTP server using a URL and the URL signing information. In block 1010, the segment is received when the URL of the segment is validated against the URL signing information.

In an embodiment, an apparatus includes means for storing content items and means for generating Uniform Resource Locator (URL) signing information based on a segment URL scope descriptor, where the segment URL scope descriptor authorizes a client to access a set of the content items.

In an embodiment, a method for authorizing a request for content items is implemented by means for receiving a request for the content items comprising a Uniform Resource Locator (URL) and signing information, wherein the content items are stored in memory and the signing information comprises a URL template and an access condition, means for verifying the request based on the signing information, and means for providing access to a set of the content items for a party associated with the request when the request is verified.

In an embodiment, a method for generating a request URL is implemented by means for receiving Uniform Resource Locator (URL) signing information from a content server, means for selecting a segment to request, means for constructing a URL pointing to the segment, means for sending a request for the segment to a Hypertext Transfer Protocol (HTTP) server using a URL and the URL signing information, and means for receiving the segment when the URL of the segment is validated against the URL signing information.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A Hypertext Transfer Protocol (HTTP) server, comprising:
a memory configured to store content items addressable via a Uniform Resource Locator (URL);
a processor operably coupled to the memory and configured to:
generate a signed URL containing a base URL with a query string, a client internet protocol (IP) address for a client authorized to access a subset of the content items, an expiry timestamp for the subset, a digital signature over the base URL, the client IP address, the expiry timestamp, and a key identification (ID) used to create the digital signature;
incorporate the signed URL into a media presentation description (MPD) provided to the client;
validate that the client is authorized to access the subset of the content items by using the client IP address, the expiry timestamp, and the digital signature upon receipt of a content request from the client that contains the signed URL; and
retrieve the subset of the content items from the memory for the client after validation; and
a transmitter operably coupled to the processor, the transmitter configured to transmit the subset of the content items to the client for viewing by a user.

2. The HTTP server of claim 1, wherein the processor is further configured to determine the subset of the content items that the client is allowed to access.

3. The HTTP server of claim 1, wherein the processor is further configured to generate the signed URL by determining an access condition.

4. The HTTP server of claim 1, wherein the signed URL is generated using a signing algorithm.

5. The HTTP server of claim 1, wherein the key ID corresponds to a private key used to generate the digital signature, and a public key used to validate the signed URL.

6. The HTTP server of claim 5, wherein the key ID corresponds to a symmetrical key used to generate both the digital signature and to validate the signed URL.

7. The HTTP server of claim 1, wherein the subset of the content items have a content property.

8. The HTTP server of claim 7, wherein the content property comprises at least one of a bitrate, a resolution, and a quality level.

9. The HTTP server of claim 8, wherein the content property adapts to a network condition, and wherein the network condition comprises at least one of a bandwidth and a power consumption rate.

10. The HTTP server of claim 1, wherein a request for the subset of the content items from the client is verified by a trusted party.

11. The HTTP server of claim 1, wherein the subset of the content items comprise a segment in Dynamic Adaptive Streaming over Hypertext Transfer Protocol (HTTP) (DASH).

* * * * *